Sept. 2, 1941.　　　F. H. HEHEMANN　　　2,254,427
VALVE
Filed July 10, 1940　　　2 Sheets-Sheet 2
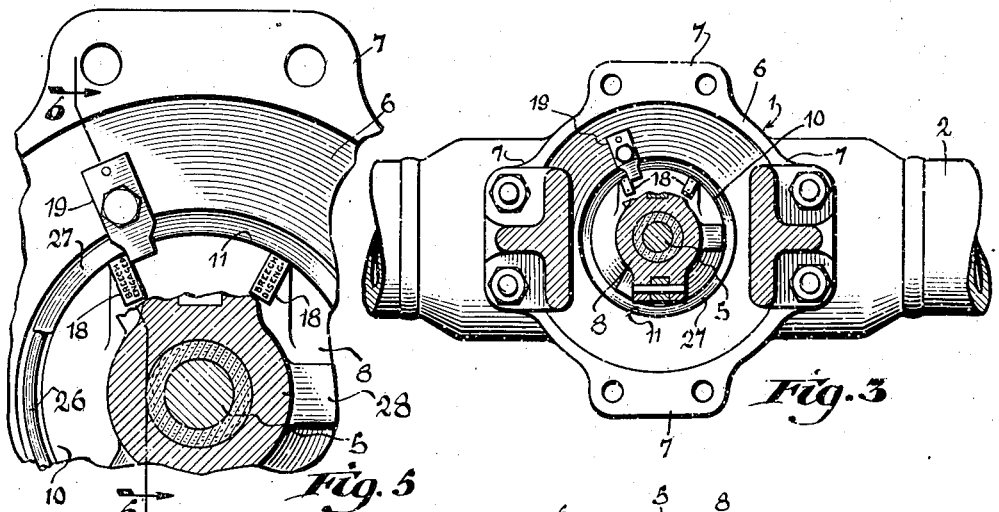
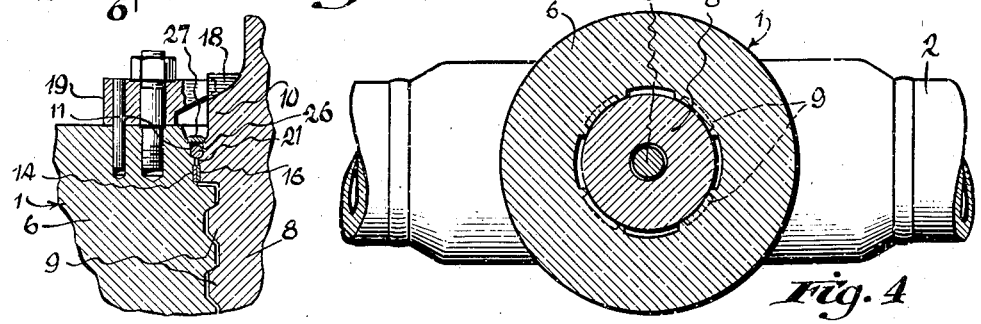
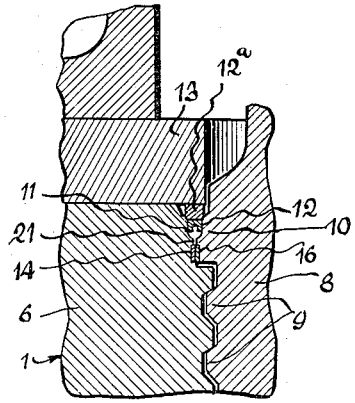
INVENTOR.
Frederick H. Hehemann
BY Olivier B. Kaiser
ATTORNEY.

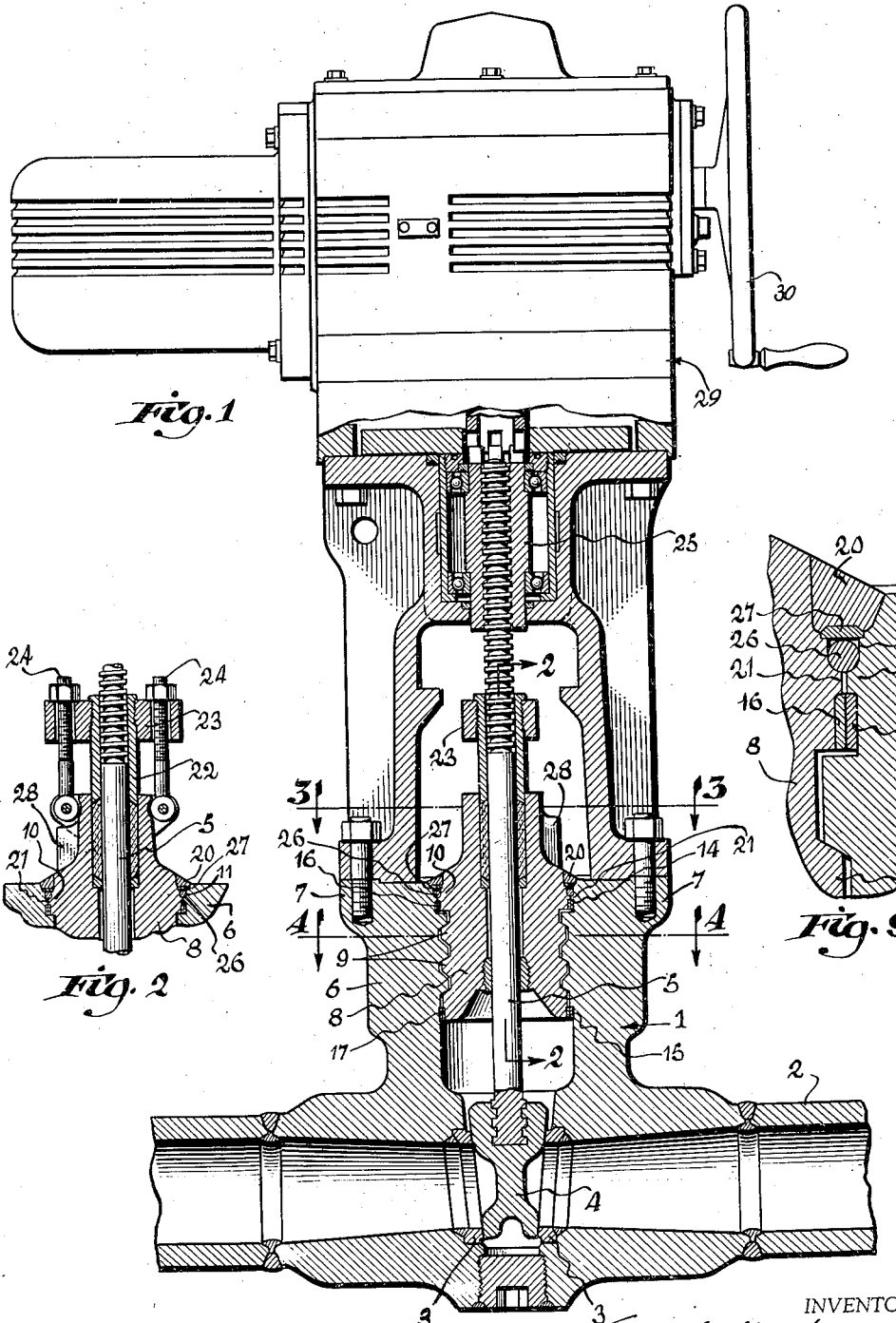

Patented Sept. 2, 1941

2,254,427

UNITED STATES PATENT OFFICE 2,254,427

VALVE

Frederick H. Hehemann, Cincinnati, Ohio, assignor to The Lunkenheimer Company, Cincinnati, Ohio, a corporation of Ohio Application July 10, 1940, Serial No. 344,765

6 Claims. (Cl. 251—49)

This invention relates to improvement in valves, primarily for installation in high pressure, high temperature lines, adapting the valve body to be welded or permanently connected in the line, to the elimination of flanged pipe joints.

Difficulty is experienced in maintaining pressure tight flanged joints in high pressure, high temperature services, such as boiler feed lines, and steam lines, which has resulted in virtually eliminating the flanged pipe joint in favor of full strength welded or fused connections; and similarly the body of a valve interposed in the pipe line is welded or fused to the pipes.

With the valves in welded connection with the pipe lines, the use of flange joints for connecting the valve bonnet to the valve body has been continued, it being desirable and necessary to remove the bonnet to dismantle the valve for inspection of the adjacent welds, and for cleaning and blowing out the lines at the time of installation and also for inspection and repair of the valve without removing or cutting out the valve body from the pipe line.

Flanged bonnet joints, however, are not immune to leakage difficulties incident to differences in temperature between the flanges and the bolts, and to the effects of creep, which result in relaxation of bolt load to the point where it no longer will maintain a pressure tight joint.

An object of the invention is to provide a valve with a mechanically locked-in bonnet, preferably of breech lock form, with the joint or seam sealed by a weld which can be chipped out to release the bonnet for dismantling the valve without removing the valve body from the line, reassembled, and again seal welded. The breech lock carries the full internal pressure load active on the joint, and the seal serves to maintain pressure tightness.

Another object of the invention is to provide a valve with a breech or mechanically locked-in bonnet, and auxiliary means for hermetically sealing the bonnet, preferably during the factory tests. After completion of the factory tests, the auxiliary sealing means are removed and the valves loosely reassembled.

Another object of the invention is to provide a valve with a breech or mechanically locked-in bonnet, in which the trimmings are loosely assembled for ready disassembly after the valves are permanently welded in the pipe lines. The permanent seal welds at the breech lock bonnet connection and at the bottom inspection plug are made after the valves are welded in the pipe line and after the pipe end welds are inspected internally and the pipe line is blown free from scale and other foreign matter.

Further objects and advantages of the invention will be more fully apparent from a description of the accompanying drawings, in which:

Figure 1 is a general view of the improved valve, having the lower portion broken away, illustrating the parts in section, with the bonnet in place and the joint thereof seal welded.

Figure 2 is a fragmentary sectional view taken on the line 2—2 of Figure 1, illustrating the packing gland as secured at the upper end of the bonnet.

Figure 3 is a sectional view taken on line 3—3, Figure 1, illustrating the stop plate in place on the valve and the bonnet locked in place prior to seal welding.

Figure 4 is a sectional view taken on line 4—4, Figure 1.

Figure 5 is an enlarged fragmentary view similar to Figure 3, further illustrating the indicator stop plate and lug arrangement.

Figure 6 is an enlarged sectional view of the stop plate and lug, taken on the line 6—6, Figure 5.

Figure 7 is a fragmentary sectional view, similar to Figure 1, illustrating the valve assembled with the auxiliary cover plate in place and with a sealing gasket installed for preliminary testing of the valve assembly.

Figure 8 is an enlarged detail sectional view similar to Figure 7, further illustrating the auxiliary sealing gasket and cover plate.

Figure 9 is an enlarged fragmentary view of the seal weld as shown in Figure 1.

The improvement is applicable to various types of valves and pressure containing vessels, and herein is exemplified in a gate valve having the valve gear for operating the valve stem or rod mounted upon and sustained by a yoke fixed upon the valve body and separate from the bonnet. The employment of a yoke or superstructure, directly mounted upon the body and separate from the bonnet for supporting the transmission or power drive unit for operating the valve, has the advantage of relieving the bonnet seal weld of the weight of the drive unit and the loads developed in operating the valve. If the yoke were mounted on the bonnet and the valve installed with the stem in a horizontal plane, vibration of the pipe line may set up objectionable stress in the seal weld, leading to a fatigue failure.

The seal welded breech lock joint, however, is not limited to valves with separate bonnet and yoke. In cases where the yoke is not too heavy it may be made integral with the bonnet; also, the joint may be applied to closures for check valves and other pressure vessels where yokes are not required.

Referring to the drawings, 1 indicates a valve body disclosed as interposed and welded in a pipe line 2. The valve, being of a gate Venturi type, is provided with a pair of spaced opposing seats 3 engageable by a valve 4 interposed between the seats and movable radially, being mounted on the inner end of a stem 5. In Figure 1 of the drawings, the valve body welded into a pipe line is shown as stationed in an upright position, so that the valve stem extends vertically.

The head 6 of the valve body is provided with four laterally extended pads or lugs 7 for mounting of the yoke, uniformly spaced and arranged in pairs with those of a pair at relatively opposite sides of the head or body. The lugs permit assembling the yoke with its arms either parallel with or at right angles to the center line of the pipe ends. When the valve is installed in a horizontal pipe line with the stem in a horizontal plane, the yoke arms should be mounted at right angles to the pipe end center line; and when the valve is installed in a vertical line the yoke arms should be mounted parallel with the pipe end center line. The four pads or lugs also serve for an auxiliary test flange for preliminary factory tests of the valve.

The stem 5 extends centrally or axially through a bonnet 8, engaged within a bore of the body. The bonnet is of sufficient size or diameter to provide, when it is removed, ample opening for insertion and removal of the valve or the seats therefor, and the necessary freedom of access into the interior of the body. The bonnet patterns a breech lock in effecting a locking closure by a combination of axial and rotary motion, and preferably is provided with a multiple or plurality of annular series of lugs 9 with tapered bearing surfaces, a construction which results in the lowest stresses and best stress distribution. A single or multiple annular series of lugs with either flat or tapering bearing surfaces may be used, depending upon service requirements. In a valve for high pressure and high temperature service, such as in boiler feed or steam lines, it is more efficient, as in the instance illustrated, to provide a plurality of annular series of lugs, as three annular series of lugs, with four lugs to an annular series, uniformly spaced apart or symmetrically arranged.

The upper end of the body of the bonnet is provided with an enlarged diameter annular flange or head 10, directly above the breech lock or lock lugs, and the body is bored to match. This arrangement provides a full round or circular opening for the body and corresponding periphery of the bonnet instead of a fluted bore or irregular periphery required for the breech lock to obtain the combination of axial and rotative motions to effect a closure. It provides a continuous joint offset and out of line with the longitudinal fluting and adapted for producing an unbroken annular recess 11 in the joined parts exteriorly exposed for accessibility to the recess to apply and receive the seal welding, or preliminarily to receive or insert a joint sealing gasket or U-shaped leather packing or washer 12, as illustrated in Figure 8, for factory testing of the valve.

The washer for preliminary factory testing of the valve is held in place in the recess by an annulus or collar 12ª bearing against the underside of a temporary cover plate or test flange 13, bolted to all of the pads or lugs 7. For preliminary test, the U-shaped gasket or packing seals the joint against leakage, and the bolted flange 13 carries the full load or pressure acting against the packing, while the breech lock lugs carry the full load or pressure within the valve body acting upon the bonnet.

The opposite ends of the joint between the body and bonnet have annular surface portions thereof coated respectively with a hard facing alloy, indicated by the surfaces 14 and 15 in the body, and the peripheral surfaces 16 and 17 on the bonnet as ring-like areas relatively contacting, to avoid adhesion and galling of these surfaces in the event the bonnet is removed while the valve is still hot. This precaution is necessary because the bonnet is quite heavy and must be rotated approximately forty-five degrees to disengage the breech lock. Ordinarily carbon steel and low alloy steel materials, as commonly used in the construction of body and bonnet, have a tendency to gall and seize under heavy moving loads when hot.

As indicator and stop is provided to designate and limit the locking and unlocking throw or rotative movement of the bonnet, comprising, a pair of spaced stop lugs 18 formed integrally upon the upper side of the head end of the bonnet. The spacing of the stops allows a partial rotation of the bonnet to approximately forty-five degrees, bringing the lugs from the disengaging position with the body to an engaging position, or vice versa, depending upon the direction of its rotation.

The stop lugs are alternately engaged against a stop plate 19 appropriately removably fixed to the top of the body having a forward tongue end projected to extend between the stop lugs 18. As the indicating stop plate 19 extends across the joint recess 11 and would interfere with the insertion of the bonnet, it is applied after the bonnet has been inserted into the body, and removed after the bonnet is locked in place to make a weld seal 20 within the recess, annularly covering and hermetically sealing the joint 21. In making the seal weld in the field, the valve bonnet and yoke are shifted to the desired position as required for the particular installation, and the indicator is mounted on the valve to show that the breech lugs are fully engaged.

The valve, by means of the stem, is adjusted to its maximum opened degree, bringing the valve in jamming engagement with the bonnet to force it upwardly. This firmly seats the breech lugs so as to avoid further movement under the influence of internal fluid pressure, thereby safeguarding against undue strains on the seal weld. The indicator plate is then removed and the bonnet joint 21 sealed by welding, the welding preferably filling the recess and as a filler marginally laps over a circumferential portion of the bonnet projecting beyond the top of the valve body.

The stem bore in the bonnet is counter-bored at its upper end, and at its lower end has an annular groove to provide stuffing boxes for the reception of packing about the stem to seal against leakage in a conventional manner. As shown in Figure 2, a gland 22 is fixed to a flange 23 encircling the stem and adjustably secured to the bonnet by a plurality of eye-bolts 24 hingedly connected to the upper end of the bonnet, and respectively engaged through apertures in the flange.

The upper or outer end of the yoke rotatively journals a nut 25, having a threaded engagement with the valve stem 5. The yoke also sustains the valve gear or stem operating unit 29 which may be either power driven, as by an electric motor, or manually through a hand wheel 30.

As the valve gear does not form a part of the present invention, further detail description thereof is herein omitted and may represent any conventional or special type to meet the service requirements.

Should it become necessary after the joint has been weld sealed to re-open the same, the weld deposit can be readily chipped or cut out with a hand or other cutting tool and the bonnet removed without disturbing or cutting out the valve body from the pipe line. Thereupon, after removing the bonnet to make an inspection or repair, the bonnet and parts removed can be easily re-assembled in and about the body, and the bonnet joint again seal welded.

The bonnet is held in mechanical intermeshing connection internally of the body, providing a very staple union therewith capable of withstanding exceedingly high internal line pressures without yield, and the weld homogeneously joins the body and bonnet, completely enveloping or covering the joint formed by their union, leaving no opportunity for leakage or its rupture.

The bonnet being devoid as a support or mounting for the valve gear, it is therefore relieved of any strains or stresses which otherwise might be imposed thereon by the weight of the valve gear or pipe line vibration, or by the forces developed in operation of the valve. The bonnet structure is very simple and compact, normally easily installed and removed, and with its body joint sealed by welding or fusion is made impervious to air or fluid and with the seal exposed it is easily accessible to be cut or chipped off for re-opening the joint to remove the bonnet.

To facilitate an opening of the seal weld, and also avoid any penetration or bond of the weld in the joint clearance below the normal depth of seal weld, the recess or annular groove 11 is of configurated form in cross section, as shown in Figure 9, to provide various stages. The lowermost stage or base is preferably of semicircular form for the reception and seating of a ring 26, circular in cross section. Above the lowermost stage, the recess is widened and formed to provide a pair of opposite shoulders or ledges forming a secondary recess for sustaining a flat backing ring 27, as a closure or guard for the lowermost stage, and a batten for the seal weld 20 filling the uppermost stage of the recess.

The ring 26 prevents weld splatter from entry into the clearance space between the body and bonnet in the event that the backing ring is accidentally penetrated during welding. By the use of the superposed flat and circular ring at the base of the recess for the seal weld, there is no opportunity for the weld to cluster and bond the clearance space, which would offer considerable resistance to the movement of the bonnet to a disengaged position of the breech lock, and would be difficult to remove in chipping out the seal weld in opening the seal for bonnet removal. It also overcomes the possibility of packing into the clearance space any accumulation in the process of chipping out the weld.

The weld space formed by the width of the groove is ample to permit the seal weld to be chipped out without injury to the bonnet or body, and the depth is readily apprehended upon reaching or penetrating the upper ring, with the ring serving to safeguard and aid in the opening and removal of the seal leaving the valve parts in a condition for re-seal welding by replacement of the upper ring, and the lower ring if necessary.

The head of the bonnet within the radius of the seal weld is provided with a plurality of radially extended lugs 28 to furnish a hold or abutment for the application of an air hammer or other instrumentality to turn the bonnet to the disengaged position of the breach lock after the seal weld has been chipped out.

Having described my invention, I claim:

1. In a valve, a valve body, a bonnet providing an insertable closure for an opening in the body and traversed by a valve operating stem projected from the interior of the body, the bonnet having an interlocking connection with the body, said body and bonnet at opposite ends of their interlocking connection respectively carrying rings in relative bearing contact and of different material than the body and bonnet to space and prevent cohesion of the body and bonnet.

2. In a valve, a valve body, a bonnet providing a closure for an opening in the head of the body and traversed by a valve operating stem projected from the interior of the body, the bonnet having a breech lock connection with the body to rigidly sustain the bonnet against line pressure imposed on the bonnet in the service of the valve, the bonnet having an annular flange extending radially beyond the breech lock portion and spaced from the adjoining surface formed by the opening in the head of the body and therewith providing an uninterrupted annular channel, and a weld seal in said channel forming a homogeneous closure of the joint at the flange union of said bonnet and body, adaptable to be cut out for bonnet removal.

3. In a valve, a valve body, a bonnet providing a closure for an opening in the head of the body and traversed by a valve operating stem, the body and bonnet having a lateral intermeshing connection and the adjoining surfaces of the body and bonnet at the outer end of the opening spaced apart providing an annular groove and open joint, a plurality of rings separately seated in the groove, providing auxiliary closures for the joint with the outermost of said rings serving as a secondary base for the groove, and a seal weld in said groove homogeneously uniting the body and bonnet for hermetically sealing the joint.

4. In a valve, a valve body, a bonnet providing a closure for an opening in the head of the body and traversed by a valve operating stem, the body and bonnet having a lateral intermeshing connection and the adjoining surfaces of the body and bonnet at the outer end of the opening spaced apart providing an annular weld receiving groove and open joint, an annulus seated in said groove providing a secondary base therefor and an auxiliary closure for the joint, and a seal fused in said groove homogeneously uniting the body and bonnet for hermetically sealing the joint.

5. In a valve, a valve body, a bonnet providing a closure for an opening in the head of the body and traversed by a valve operating stem, the body and bonnet having a lateral intermeshing connection and the adjoining surfaces of the body and bonnet at the outer end of the opening spaced apart providing a weld receiving groove and open joint and a secondary annular chamber interposed between said weld receiving groove and the body-bonnet intermeshing connection, a shield ring partially filling said intermediate chamber, and a seal weld in said weld receiving groove homogeneously uniting the body and bonnet for hermetically sealing the joint.

6. In a valve, a valve body, a bonnet providing a closure for an opening in the head of the body and traversed by a valve operating stem, the body and bonnet having a lateral intermeshing connection and the adjoining surfaces of the body and bonnet at the outer end of the opening spaced apart forming a weld receiving groove, a flat backing ring forming an intermediate annular chamber separating the welding groove and the body-bonnet intermeshing connection, a shield ring in said intermediate chamber, and a seal weld in said groove homogeneously uniting the body, bonnet and flat backing ring for hermetically sealing the joint.

FREDERICK H. HEHEMANN.